(12) United States Patent
Cannon

(10) Patent No.: US 10,989,585 B2
(45) Date of Patent: Apr. 27, 2021

(54) METHODS AND APPARATUS TO MEASURE MASS IN LOW GRAVITY ENVIRONMENTS

(71) Applicant: The Boeing Company, Chicago, IL (US)

(72) Inventor: Kevin Cannon, Titusville, FL (US)

(73) Assignee: The Boeing Company, Chicago, IL (US)

(*) Notice: Subject to any disclaimer, the term of this patent is extended or adjusted under 35 U.S.C. 154(b) by 496 days.

(21) Appl. No.: 15/875,561

(22) Filed: Jan. 19, 2018

(65) Prior Publication Data
US 2019/0226903 A1 Jul. 25, 2019

(51) Int. Cl.
| | | |
|---|---|---|
| *G01G 19/00* | (2006.01) | |
| *G01G 9/00* | (2006.01) | |
| *G01G 3/00* | (2006.01) | |
| *G01G 3/16* | (2006.01) | |
| *B64G 1/22* | (2006.01) | |

(52) U.S. Cl.
CPC .............. *G01G 19/00* (2013.01); *G01G 3/00* (2013.01); *G01G 3/165* (2013.01); *G01G 9/00* (2013.01); *B64G 1/22* (2013.01)

(58) Field of Classification Search
CPC .......... G01G 3/165; G01G 19/00; G01G 3/00; G01G 9/00
See application file for complete search history.

(56) References Cited

U.S. PATENT DOCUMENTS

| | | | | |
|---|---|---|---|---|
| 2006/0011390 A1* | 1/2006 | Paik | ......................... | G01G 9/00 177/1 |
| 2011/0313705 A1* | 12/2011 | Esser | ...................... | A61B 5/112 702/104 |
| 2014/0247129 A1* | 9/2014 | de la Fuente | ............ | A61B 5/11 340/573.1 |

* cited by examiner

Primary Examiner — Regis J Betsch
Assistant Examiner — Jeremy A Delozier
(74) Attorney, Agent, or Firm — Hanley, Flight & Zimmerman, LLC

(57) ABSTRACT

Methods and apparatus to measure mass in low gravity environments are disclosed. A disclosed example low-gravity mass-measuring apparatus includes a coupler to couple a coupling portion to an object, the coupling portion including a first inertial measurement unit (IMU), a force device to provide a force to cause a movement of a dock relative to the coupling portion, where the dock is releasably couplable to the coupling portion and includes a second IMU, and a processor to calculate a mass of the object based on movement data from the first and second IMUs and the force.

19 Claims, 6 Drawing Sheets

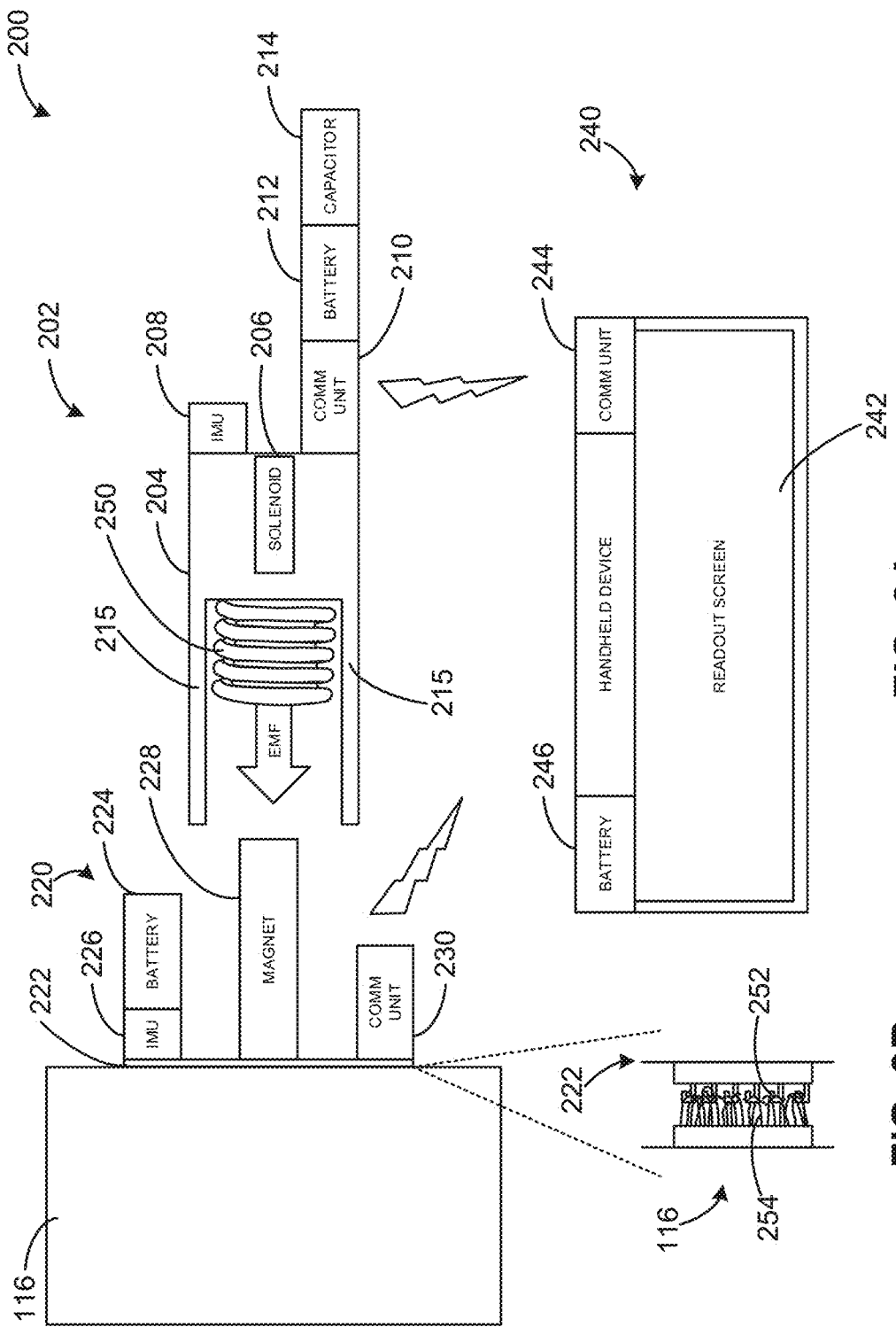

METHODS AND APPARATUS TO MEASURE MASS IN LOW GRAVITY ENVIRONMENTS

FIELD OF THE DISCLOSURE

This disclosure relates generally to mass measurements and, more particularly, to methods and apparatus to measure mass in low gravity environments.

BACKGROUND

In some situations, a mass of an object within a spacecraft in an orbital path (e.g., a near orbit path) may necessitate measurement to account for flight, movement, inertial and/or thrust effects. However, these mass measurements can be difficult to perform in low gravity environments. Some known low gravity measurement devices employ springs to calculate a mass. However, these known devices cannot typically measure smaller masses. Further, such devices can have inherent inaccuracies.

SUMMARY

An example low-gravity mass-measuring apparatus includes a coupler to couple a coupling portion to an object, where the coupling portion includes a first inertial measurement unit (IMU), a force device to provide a force to cause a movement of a dock relative to the coupling portion, where the dock is releasably couplable to the coupling portion and includes a second IMU, and a processor to calculate a mass of the object based on movement data from the first and second IMUs and the force.

An example method of measuring a mass of an object in a low gravity environment includes coupling a coupling portion to the object, directing a force to cause the coupling portion to move away from a dock that is releasably couplable to the coupling portion, obtaining first movement data of the coupling portion and second movement data of the dock, and calculating, using a processor, a mass of the object based on the first and second movement data, and the force.

An example tangible machine readable medium includes instructions, which when executed, cause a processor to determine a force during a separation of a coupling portion from a dock in a low gravity environment, where the coupling portion is coupled to an object, and calculate a mass of the object based on the force and movement data, where the movement data is measured during separation of the coupling portion from the dock.

BRIEF DESCRIPTION OF THE DRAWINGS

FIG. 2A depicts an example inertial mass measurement apparatus in accordance with examples disclosed herein.

FIG. 2B is a detailed view of an example securing device that may be implemented in examples disclosed herein.

Figures 1A, 1B:
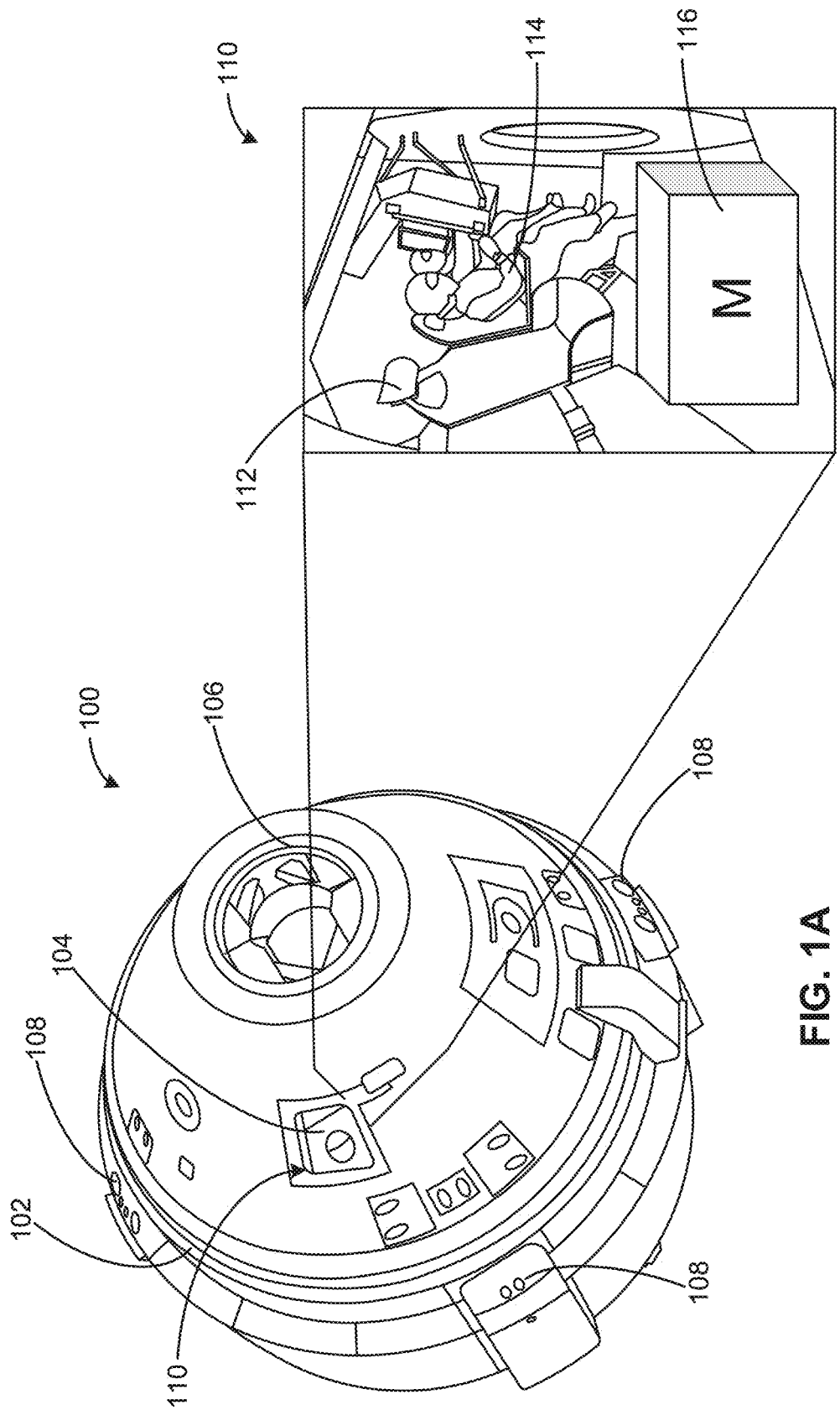
FIG. 1A is an example spacecraft in which examples disclosed herein may be implemented.
FIG. 1B is a view of an interior of the spacecraft of FIG. 1.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Methods and apparatus to measure mass in low gravity environments are disclosed. Some known low gravity mass measuring devices employ springs. However, these known mass measuring devices, which are sometimes used to determine a mass of an astronaut, are not typically suited to measure relatively small masses and can be inaccurate in some applications.

Examples disclosed herein enable automated and accurate mass measurements in low gravity environments, such as in space and/or orbit. Examples disclosed herein implement an inertial mass measuring device having a coupling portion and a dock, both of which are releasably couplable to one another. The coupling portion is attached to an object to be measured and a force device, such as a solenoid or spring, causes the coupling portion along with the object to move relative to the dock. In particular, the force device causes the coupling portion and the dock to move away from one another (e.g., in opposite directions from one another). Movement data is obtained during the separation and used to calculate a mass of the object.

In some examples, the coupling portion includes a magnet. In some such examples, the magnet is used to couple the coupling portion to the object. In some examples, the coupling portion is coupled to the object via a hook and loop. In some examples, the dock includes a solenoid.

FIG. 1A is an example spacecraft 100 in which examples disclosed herein may be implemented. According to the illustrated example, the spacecraft 100 includes a body 102, window 104, a docking section 106 and maneuvering thrusters 108. Further, the spacecraft 100 has an interior 110 that is partially viewable through the window 104.

In operation, the example spacecraft 100 is an orbital vehicle that is placed into a planetary orbit and maintains a path within that orbit. In this example, the thrusters 108 orient and maintain the spacecraft 100 in the planetary orbit. Maneuvers to change orbit and/or move the spacecraft 100 onto an orbital path can be affected by mass distribution of objects within the spacecraft 100. Accordingly, it may be advantageous in some examples to measure a mass of at least one object within the interior 110 to account for any potential inertial effects. Accordingly, the mass can be properly distributed in the interior 110 to mitigate such inertial effects.

FIG. 1B is a view of the interior 110 of the spacecraft 100 of FIG. 1. According to the illustrated view of FIG. 1B, seats 112 are shown holding pilots 114. In this example, a mass of an object 116 is to be measured in this low gravity environment (e.g., a zero gravity environment) so that the object 116 can be appropriately moved and/or adjusted to account for any potential inertial effect to the spacecraft 100.

FIG. 2A depicts an example inertial mass measurement apparatus 200 in accordance with examples disclosed herein. The inertial mass measurement apparatus 200 of the illustrated example includes a dock (e.g., a propulsion portion, a launch portion, etc.) 202, which includes a body (e.g., a clamping body) 204, a solenoid 206, a first inertial measuring unit (IMU) 208, a communication unit (e.g., a transceiver) 210, a battery 212 and a capacitor 214. In this example, the body 204 has arms 215 to facilitate alignment of the dock 202 to a coupling portion (e.g., a movement portion, an attachment portion, etc.) 220 of the inertial mass measurement apparatus 200.

The example coupling portion (e.g., a movement portion, an attachment portion, etc.) 220, which is releasably couplable to the dock 202 in this example, includes a coupler 222, a battery 224, a second IMU 226, a magnet 228 and a communication unit 230. In some examples, the inertial mass measurement apparatus 200 further includes a handheld device (e.g., a handheld reader) 240, which may be implemented as a tablet, a laptop, a mobile phone, or any other appropriate device. According to the illustrated view of FIG. 2A, the handheld device 240 includes a screen 242, a communication unit 244 and battery 246. In some examples, the first IMU 208 is identical to the second IMU 226. Additionally or alternatively, the communication unit 210, the communication unit 230 and/or the communication unit 244 are identical.

To couple (e.g., releasably couple) the coupler 222 and the coupling portion 220 to the object 116, the coupler 222 is attached to the object 116 via a securing device (e.g., a securing mechanism), such as a hook and loop (e.g., Velcro®), for example. However, any other type of securing device and/or fastener may be implemented. For example, a snap system, a mechanical fastener (e.g., a screw a bolt, etc.), a chemical fastener (e.g., an adhesive, an epoxy, etc.), a mechanical mating system (e.g., a protrusion and aperture) and/or a magnet may be implemented instead. In some examples, the magnet 228 is used to couple the coupling portion 220 to the object 116.

To propel the coupling portion 220 away from the dock 202, the example solenoid 206 is provided with electrical power from the battery 212 to generate a magnetic field. In turn, the magnet 228 is moved by the magnetic field provided by the solenoid 206. In this example, a force provided between the solenoid 206 and the magnet 228 is known based on an amount and/or a duration of the current or voltage provided from the battery 212 to the solenoid 206 (e.g., discharged energy from the capacitor 214 to the solenoid 216). In this example, the arms 215 facilitate controlled relative motion (e.g., linear relative motion) of the dock 202 with the coupling portion 220. In particular, surfaces of the arms 215 guide respective surfaces of the coupling portion 220 (e.g., surfaces of the magnet 228). While the solenoid 206 in conjunction with the magnet 228 is implemented in this example, any other appropriate force device and/or movement apparatus can be utilized instead. For example, a spring 250 can be implemented in some examples. Additionally or alternatively, gearing, a gas expansion/compression system, a motor, a pneumatic system and/or a hydraulic system can be used instead.

To determine a mass of the object 116 based on causing relative motion between the dock 202 and the coupling portion 220, the handheld device 240 of the illustrated example receives movement data from at the communication unit 244 from both of the communication units 210, 230 during relative motion of the dock 202 with respect to the coupling portion 220. In turn, the example handheld device 240 calculates the mass of the object 116 based on this movement data. An example calculation is described in detail below in connection with FIG. 4.

While the example handheld device 240 is shown separate from the dock 202 and the coupling portion 220, in some examples, the handheld device 240 is integrated with one of the dock 202 or the coupling portion 220. In other examples, the movement data is transmitted to an external computer and/or network for mass calculation(s) of the object 116 via the communication units 210, 230. Additionally or alternatively, inertial properties (e.g., geometric inertial properties) of the object 116 are calculated by the handheld device 240.

Turning to FIG. 2B, a detailed view of an example securing device that may be implemented in examples disclosed herein is shown. In particular, the coupler 222 includes a hook fastener 252 while the object 116 has a corresponding loop fastener 254 coupled thereto. However, any appropriate securing or fastening device may be implemented.

Figure 3A:
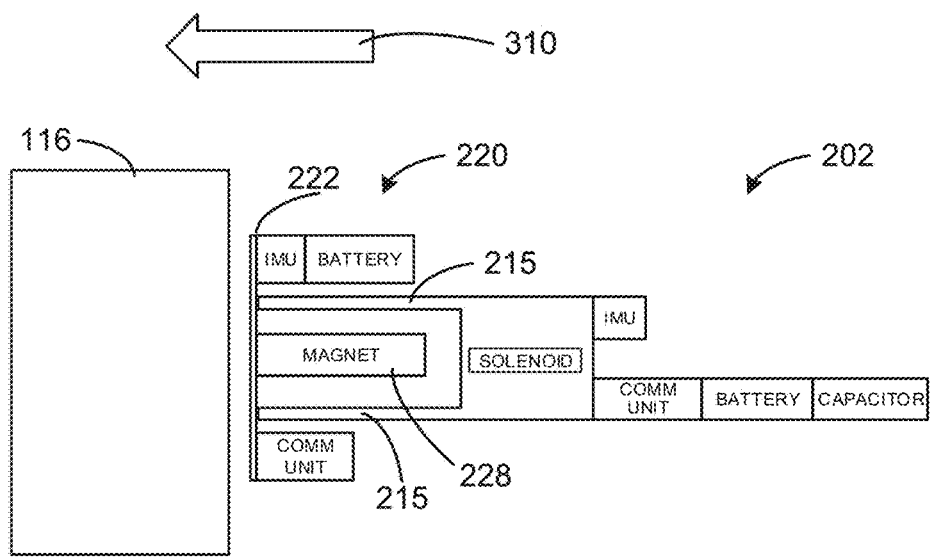
FIGS. 3A-3C depict example steps to measure a mass in a low gravity environment.
Figure 3B:
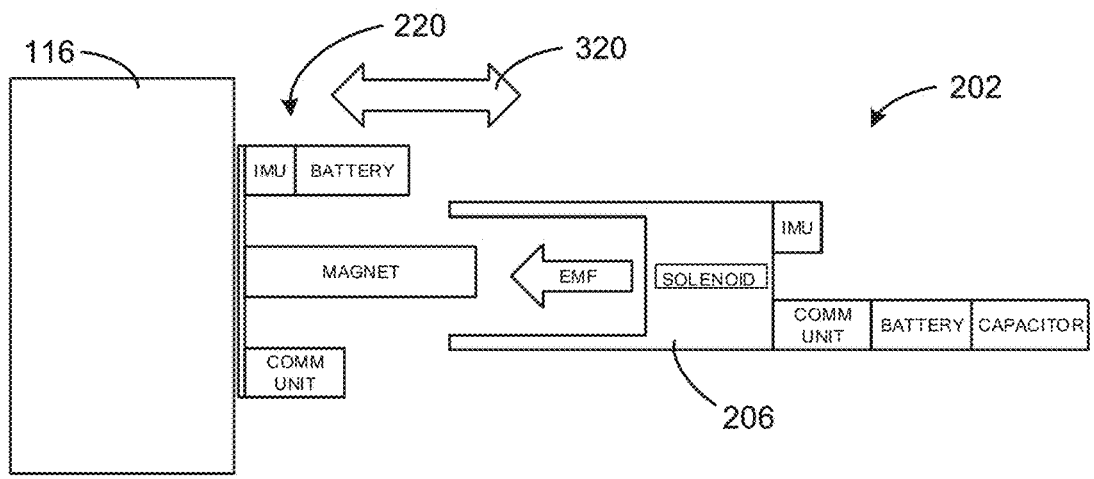
Figure 3C:
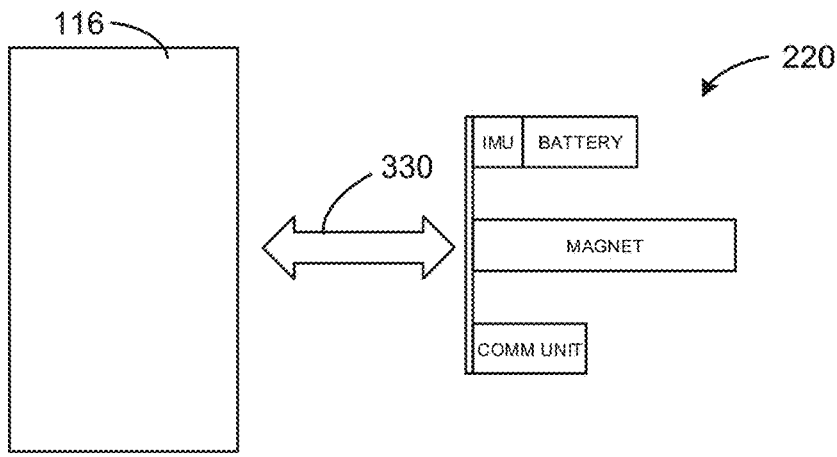

FIGS. 3A-3C depict example operations to measure a mass in a low gravity environment. Turning to FIG. 3A, the dock 202 is shown coupled to the coupling portion 220. In particular, the arms 215 are attached to the coupler 222 while surrounding and aligning the magnet 228 and/or a portion of the coupling portion 220. According to the illustrated example, the coupler 222 is being moved towards the object 116 while the dock 202 is attached to the coupling portion 220 in a direction generally indicated by arrow 310 to couple (e.g., releasably couple) the coupler 222 to the object 116.

FIG. 3B depicts movement of the dock 202 and coupling portion 220 while the coupling portion 220 is attached to the object 116. In particular, a double arrow 320 depicts motion of the coupling portion 220 relative to the dock 202. In particular, the dock 202 and the coupling portion 220 both move away from one another in opposite directions. In this example, the object 116 also moves along with the coupling portion 220 because the object 116 is coupled to the coupling portion 220.

FIG. 3C depicts a separation of the coupling portion 220 from the object 116, as generally indicated by a double arrow 330. In this example, after movement data is obtained, the coupling portion 220 is separated from the object 116 so that the coupling portion 220 can be coupled (e.g., reattached) to the dock 202 for further mass measurements, for example.

Figure 4:
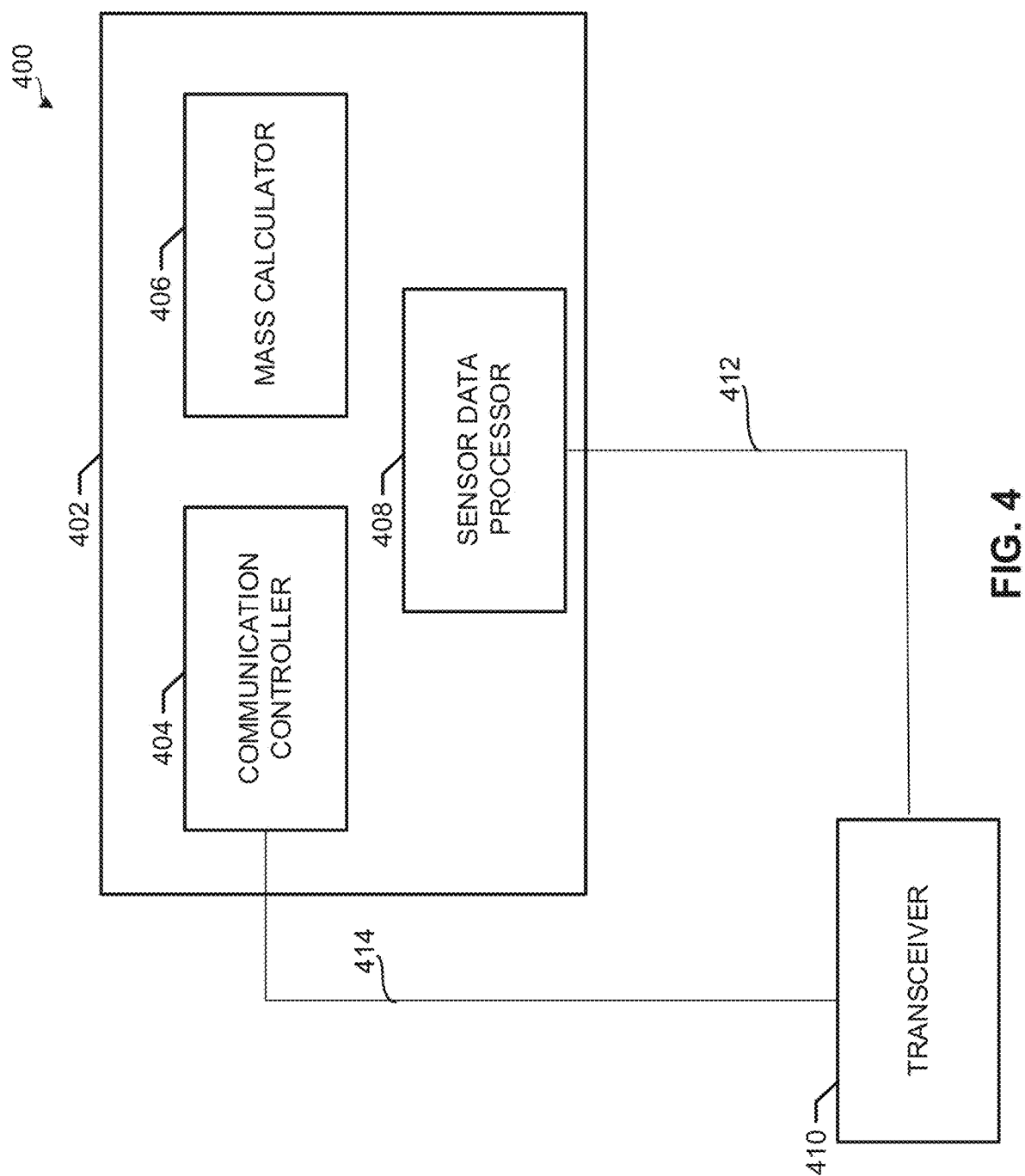
FIG. 4 is a schematic overview of an example mass calculator system that may be implemented in examples disclosed herein.

FIG. 4 is a schematic overview of an example mass calculator system 400 that may be implemented in examples disclosed herein. The example mass calculator system 400 can be implemented in the handheld device 240, the dock 202 and/or the coupling portion 220. The mass calculator system 400 of the illustrated example includes an inertial motion analyzer 402, which includes a communication controller 404, a mass calculator 406 and a sensor data processor 408. In this example, the mass calculator system 400 also includes a transceiver 410 that is communicatively coupled to the communication controller 404 via a communication line 414. Further, the example transceiver 410 is communicatively coupled to sensor data processor 408 via a communication line 412.

To direct separation from and/or movement of the dock 202 relative to the coupling portion 220, the example communication controller 404 directs the transceiver 410 to transmit a signal to cause the solenoid 206 to emit an electromagnetic field, thereby moving the coupling portion 220 away from the dock 202. Additionally or alternatively, the communication controller 404 controls reception and transmission of first and second movement data from the first and second IMUs 208, 226, respectively.

To sort process and/or format the first and second movement data, the sensor data processor 408 of the illustrated example receives the first and second movement data from the transceiver 410 and sorts and/or formats the first and second movement data for the mass calculator 406.

To calculate a mass of the object 116, the example mass calculator 406 utilizes the first and second movement data. According to the illustrated example, the force provided by the solenoid 206, $F_{Solenoid}$, the mass of the coupling portion 220, $m_{attached\ unit}$, and the mass of the dock 202, $m_{floating\ unit}$, are all known (e.g., prior measured or predetermined values). Accordingly, the velocity of the dock 202, $v_{floating\ unit}$, the velocity of the coupling portion along with the object 116, $v_{attached\ unit+bag}$, and the time differential, $\Delta t$, are all measured and recorded by the first and second IMUs 208, 226 in this example. Accordingly, a mass of the object 116, $m_{bag}$, is calculated by the mass calculator 506 in this example.

Equations 1a-4 illustrate example equations that may be implemented by the example mass calculator 406. Equation 1a below indicates conservation of momentum:

$$m_{attached\ unit+bag} \times v_{attached\ unit+bag} = m_{floating\ unit} \times v_{floating\ unit} \quad (1a)$$

EQ1b below illustrates division of equation 1b by the aforementioned time differential:

$$\frac{m_{attached\ unit+bag} \times v_{attached\ unit+bag}}{\Delta t} = \frac{m_{floating\ unit} \times v_{floating\ unit}}{\Delta t} \quad (1b)$$

Equation 2a is used to indicate equal and opposite forces applied:

$$F_{Solenoid} = F_{attached\ unit+bag} = F_{floating\ unit} \quad (2a)$$

Rearranging and substituting the above yields equation 2b:

$$F_{attached\ unit+bag} = (m_{bag} + m_{attached\ unit}) \frac{v_{attached\ unit+bag}}{\Delta t} \quad (2b)$$

Further rearrangement yields equation 2c:

$$(m_{bag} + m_{attached\ unit}) = \frac{F_{attached\ unit+bag} \times \Delta t}{v_{attached\ unit+bag}} \quad (2c)$$

Subtracting $m_{attached\ unit}$ from both sides yields equation 3a:

$$m_{bag} = \frac{F_{attached\ unit+bag} \times \Delta t}{v_{attached\ unit+bag}} - m_{attached\ unit} \quad (3a)$$

Equation 3a is rearranged to yield Equation 3b:

$$m_{bag} = \frac{F_{floating\ unit} \times \Delta t}{v_{attached\ unit+bad}} - m_{attached\ unit} \quad (3b)$$

Further substitutions to Equation 3b then yield Equation 3c below:

$$m_{bag} = \frac{\frac{m_{floating\ unit} \times v_{floating\ unit}}{\Delta t} \times \Delta t}{v_{attached\ unit+bag}} - m_{attached\ unit} \quad (3c)$$

Accordingly, the mass of the object 116 is solved for and expressed in Equation 4 as:

$$m_{bag} = \frac{m_{floating\ unit} \times v_{floating\ unit}}{v_{attached\ unit+bag}} - m_{attached\ unit} \quad (4)$$

The example equations/calculations above are only examples. Accordingly, any appropriate equations, mathematical relationships and/or variables may be used in determining the mass of the object 116. Any other appropriate parameters or variables may be solved for, including, but not limited to inertia, inertial properties, mass distribution and/or center of mass.

While an example manner of implementing the example mass calculator system 400 of FIG. 4 is illustrated in FIG. 4, one or more of the elements, processes and/or devices illustrated in FIG. 4 may be combined, divided, re-arranged, omitted, eliminated and/or implemented in any other way. Further, the example communication controller 404, the example mass calculator 406, the example sensor data processor 408 and/or, more generally, the example mass calculator system 400 of FIG. 4 may be implemented by hardware, software, firmware and/or any combination of hardware, software and/or firmware. Thus, for example, any of the example communication controller 404, the example mass calculator 406, the example sensor data processor 408, and/or, more generally, the example mass calculator system 400 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, controller 404, the example mass calculator 406, and/or the example sensor data processor 408 is/are hereby expressly defined to include a non-transitory computer readable storage device or storage disk such as a memory, a digital versatile disk (DVD), a compact disk (CD), a Blu-ray disk, etc. including the software and/or firmware. Further still, the example mass calculator system 400 of FIG. 4 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
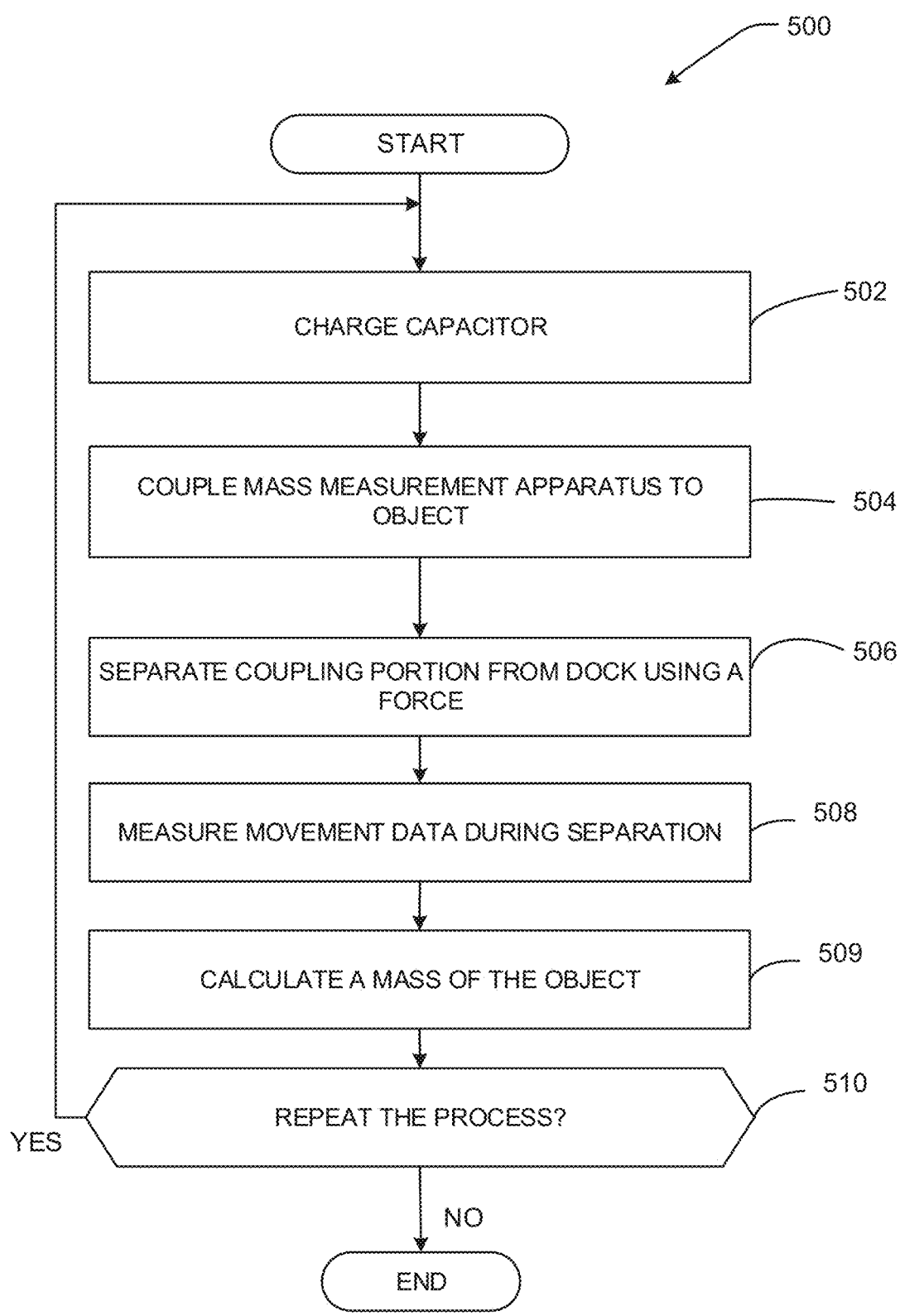
FIG. 5 is a flowchart representative of an example method to implement the example inertial mass measurement apparatus and/or the example mass calculator system.

A flowchart representative of example hardware logic or machine readable instructions for implementing the mass calculator system 400 of FIG. 4 is shown in FIG. 5. The machine readable instructions may be a program or portion of a program for execution by a processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 5, many other methods of implementing the example mass calculator system 400 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

The example method 500 begins as a mass of the object 116 is to be calculated in a low gravity environment. The mass is to be calculated so that inertial effects of the mass can be considered when maneuvering the spacecraft 100.

In some examples, the capacitor 214 is charged (block 502). In some such examples, the battery 212 charges the capacitor 214, which is electrically coupled to the solenoid 206.

According to the illustrated example, the inertial mass measurement apparatus 200 is coupled to the object 116 (block 504). In this example, the coupler 222 is attached to the object 116 while the coupling portion 220 is coupled to the dock 202. In other examples, only the coupling portion 220 is coupled to the object 116 (e.g., the dock 202 is later coupled to the coupling portion 220).

Next, the coupling portion 220 (along with the object 116) is separated from the dock 202 using a force provided by the solenoid 206 in this example (block 506). In particular, the coupling portion 220 and the object 116 are accelerated to a first velocity while the dock 202 is accelerated to a second velocity.

According to the illustrated example, parameters and/or movement data are measured at the first and second IMUs, 208, 226, respectively, during separation of the coupling portion 220 from the dock 202 (block 508). In this example, the movement data includes velocity data related to time (e.g., a velocity-time history, velocity related to displacement, etc.).

The example mass calculator 506 calculates the mass of the object 116 (block 509). In this example, the mass calculator 506 utilizes the movement data in conjunction with the force applied during the separation of the coupling portion 220 from the dock 202 to calculate the mass. In other examples, the force is measured during the separation for this calculation.

It is then determined whether to repeat the process (block 510). If the process is to be repeated (block 510), control of the process returns to block 502. Otherwise, the process ends. This determination may be made based on whether mass(es) of additional objects are to be measured.

Figure 6:
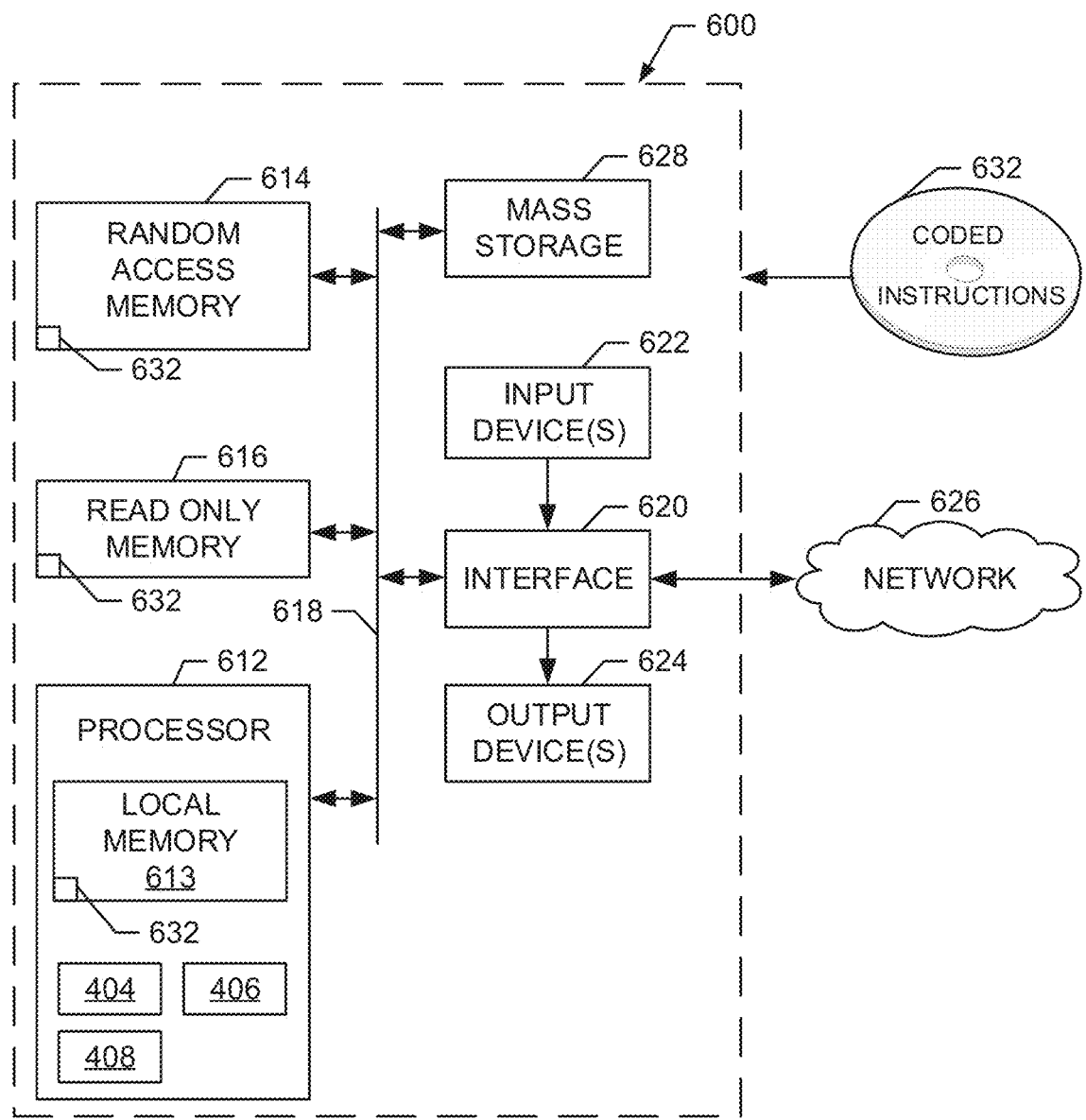
FIG. 6 is a block diagram of an example processing platform structured to execute the instructions of FIG. 5 to implement the example inertial mass measurement apparatus and/or the example mass calculator system.

FIG. 6 is a block diagram of an example processor platform 600 structured to execute the instructions of FIG. 5 to implement the mass calculator system 400 of FIG. 4. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the communication controller 404, the mass calculator 406 and the sensor data processor 408.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIG. 5 may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus and articles of manufacture have been disclosed that can automatically measure a mass of objects in low gravity environments. Examples disclosed herein enable quick and accurate measurements of mass that would otherwise be difficult to obtain in certain environments, such as in low gravity environments.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A low-gravity mass-measuring apparatus comprising:
a coupler to couple a coupling portion to an object, the coupling portion including a first inertial measurement unit (IMU);
a force device to provide a force to release a dock from the coupling portion and cause a movement of the dock relative to the coupling portion, the dock releasably couplable to the coupling portion and including a second IMU, the force device including a solenoid to move a magnet of the coupling portion away from the dock; and
a processor to calculate a mass of the object based on movement data from the first and second IMUs and the force.

2. The apparatus as defined in claim 1, wherein the processor is disposed in a handheld reader.

3. The apparatus as defined in claim 1, further including a capacitor of the dock, wherein the capacitor is electrically coupled to the force device.

4. The apparatus as defined in claim 1, wherein the magnet is to be used to couple the coupling portion to the object.

5. The apparatus as defined in claim 1, wherein the force device further includes a spring.

6. The apparatus as defined in claim 1, wherein the coupling portion is coupled to the object via a hook and loop.

7. The apparatus as defined in claim 1, wherein the dock includes arms to align the coupling portion to the dock.

8. The apparatus as defined in claim 7, wherein the arms guide the dock and the coupling portion to move in opposite directions from one another.

9. A method of measuring a mass of an object in a low gravity environment, the method comprising:
coupling a coupling portion to the object;
directing a force, via a force device, to cause the coupling portion to release from a dock that is releasably couplable to the coupling portion, the force device including a solenoid to move a magnet of the coupling portion away from the dock; and
obtaining first movement data of the coupling portion and second movement data of the dock; and
calculating, using a processor, a mass of the object based on the first and second movement data, and the force.

10. The method as defined in claim 9, further including charging a capacitor; and discharging energy from the capacitor to the solenoid to move the magnet of the coupling portion.

11. The method as defined in claim 10, wherein the capacitor is charged via a battery.

12. The method as defined in claim 9, wherein coupling the coupling portion to the object includes use of a hook and a loop.

13. The method as defined in claim 9, wherein directing the force to cause the coupling portion to move away from the dock causes the dock and the coupling portion to move in opposite directions.

14. The method as defined in claim 9, wherein coupling a coupling portion to the object includes coupling the magnet of the coupling portion to the object.

15. A non-transitory machine readable medium comprising instructions, which when executed, cause a processor to at least:
determine a force during release of a coupling portion from a dock in a low gravity environment, wherein the coupling portion is coupled to an object, the force caused by a solenoid of the dock moving a magnet of the coupling portion away from the dock; and
calculate a mass of the object based on the force and movement data, wherein the movement data is measured during separation of the coupling portion from the dock.

16. The non-transitory machine readable medium as defined in claim 15, wherein the instructions cause the processor to determine a first momentum of the coupling portion and a second momentum of the dock.

17. The non-transitory machine readable medium as defined in claim 15, wherein the instructions cause the processor to direct the solenoid of the dock to move the magnet of the coupling portion.

18. The non-transitory machine readable medium as defined in claim 15, wherein the force is determined based on a known value of force associated with a force device of at least one of the dock or the coupling portion.

19. The non-transitory machine readable medium as defined in claim 15, wherein the movement data is obtained from first and second inertial measuring units (IMUs) of the coupling portion and the dock, respectively.

* * * * *